United States Patent
Mekata et al.

(10) Patent No.: US 6,700,124 B1
(45) Date of Patent: Mar. 2, 2004

(54) INFRARED IMAGING DEVICE, VEHICLE HAVING THE SAME INSTALLED THEREIN, AND INFRARED IMAGE ADJUSTMENT DEVICE

(75) Inventors: Tsuyoshi Mekata, Osaka (JP); Taro Imagawa, Osaka (JP); Koji Morikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/889,443

(22) PCT Filed: Jan. 13, 2000

(86) PCT No.: PCT/JP00/00116
§ 371 (c)(1),
(2), (4) Date: Jul. 12, 2001

(87) PCT Pub. No.: WO00/42399
PCT Pub. Date: Jul. 20, 2000

(30) Foreign Application Priority Data

Jan. 14, 1999 (JP) ................................ 11-7636

(51) Int. Cl.⁷ ............................................ G01J 5/02
(52) U.S. Cl. ................................................. 250/351
(58) Field of Search ......................................... 250/351

(56) References Cited

U.S. PATENT DOCUMENTS

| | | |
|---|---|---|
| 4,866,275 A | 9/1989 | Jaeger et al. |
| 5,118,943 A | 6/1992 | Le Bars et al. |
| 5,276,319 A | 1/1994 | Hepfer et al. |
| 5,994,701 A * | 11/1999 | Tsuchimoto et al. ......... 250/351 |
| 6,274,869 B1 * | 8/2001 | Butler ..................... 250/338.1 |

FOREIGN PATENT DOCUMENTS

| | | |
|---|---|---|
| JP | 62-138153 | 8/1987 |
| JP | 3-255795 | 11/1991 |
| JP | 05-302855 | 11/1993 |
| JP | 6-34449 | 2/1994 |
| JP | 6-94539 | 4/1994 |
| JP | 6-229820 | 8/1994 |
| JP | 6-341904 | 12/1994 |
| JP | 9-73596 | 3/1997 |
| JP | 9-264794 | 10/1997 |
| JP | 10-111172 | 4/1998 |
| JP | 10-142065 | 5/1998 |
| JP | 10-274564 | 10/1998 |
| JP | 11-51773 | 2/1999 |
| JP | 11-83635 | 3/1999 |

* cited by examiner

*Primary Examiner*—Constantine Hannaher
(74) *Attorney, Agent, or Firm*—Harness, Dickey & Pierce, P.L.C.

(57) ABSTRACT

In an infrared imaging device, shutting means 40 is configured so that it can be opened/closed and so as to shut off an infrared radiation coming into an optical system 20 when it is closed. During an imaging operation, the shutting means 40 is opened, and the optical system 20 causes an infrared radiation from an object 70 to form an image on an infrared detector 10. The infrared detector 10 outputs a signal according to the amount of infrared light received by each pixel. Correction means 30 corrects sensitivity variations among pixels, the influence of the infrared radiation from the optical system 20, etc. During a calibration operation, the shutting means 40 is closed, and the correction means 30 determines a correction coefficient for correcting fluctuations in the amount of infrared radiation from the optical system 20 by using the output of the infrared detector 10 imaging the shutting means 40.

12 Claims, 11 Drawing Sheets

PRIOR ART

INFRARED IMAGING DEVICE, VEHICLE HAVING THE SAME INSTALLED THEREIN, AND INFRARED IMAGE ADJUSTMENT DEVICE

TECHNICAL FIELD

The present invention relates to a technique of performing a temperature calibration in an infrared imaging device, and a technique of displaying an infrared image in a more legible manner.

BACKGROUND ART

An infrared imaging device is capable of remotely measuring the temperature of an object, and is used as a surveillance camera, or the like, for detecting a human or detecting a car.

FIG. 9 is a diagram illustrating an exemplary configuration of a conventional infrared imaging device (described in Japanese Laid-Open Patent Publication No. 5-302855). The configuration of FIG. 8 is used for the purpose of calibrating the relationship between the output signal and the temperature.

In FIG. 8, the characteristics of an infrared detector 1010 (object temperature versus brightness table) as illustrated in FIG. 9 are pre-stored in temperature characteristic correction means 1050. Each of graph curves 1210, 1220, 1230 and 1240 of FIG. 9 represents a relationship between an object temperature T and an output voltage Ei of the infrared detector 1010, with temperatures T1, T2, T3 and T4 in the vicinity of the infrared detector 1010 being used as parameters.

Temperature measurement means 1080 measures a temperature Tx in the vicinity of the infrared detector 1010. Temperature characteristic correction means 1050 uses the temperature Tx and the characteristics of FIG. 9 to obtain the object temperature T from the output voltage Ei of the infrared detector 1010. Assuming that T2<Tx<T3, the temperature characteristic correction means 1050 creates a characteristic curve 1250 by interpolating the graph curves 1220 and 1230, respectively corresponding to the temperatures T2 and T3, and converts the output voltage Ei of the infrared detector 1010 into the object temperature T by using the characteristic curve 1250.

FIG. 10 is a diagram illustrating another exemplary configuration of a conventional infrared imaging device (described in Japanese Laid-Open Patent Publication No. 10-111172).

In FIG. 10, optical systems 1310 and 1320 cause the infrared image of an object 1330 to form an image on an infrared detector 1340. Each of a reference heat source A 1350 and a reference heat source B 1360 is a heat source using a Peltier element, and the temperature thereof is variable and controlled by controllers 1440 and 1450, respectively.

The infrared imaging device illustrated in FIG. 10 images the target object during an effective scanning period, while it images the reference heat source A 1350 and the reference heat source B 1360 during an ineffective scanning period. Average value calculation means 1370 calculates the average value of the output of the infrared detector 1340 during the effective scanning period. Reference heat source A output calculation means 1380 calculates the average value of the output of the infrared detector 1340 while imaging the reference heat source A 1350 during the Ineffective scanning period, whereas the reference heat source output calculation means 1390 calculates the average value of the output of the infrared detector 1340 while Imaging the reference heat source B 1360 during the ineffective scanning period, and median value output means 1400 outputs the median value of these calculation results. A subtractor 1410 subtracts the output of the median value output means 1400 from the output of the average value calculation means 1370, and an adder 1420 adds a predetermined temperature difference ΔT to the subtraction result and provides the obtained value to the reference heat source A controller 1440, whereas a subtractor 1430 subtracts the temperature difference ΔT from the subtraction result and provides the obtained value to the reference heat source B controller 1450. The controllers 1440 and 1450 perform a feedback control so that the subtraction result of the subtractor 1410 is zero, i.e., the output of the average value calculation means 1370 and the output of the median value output means 1400 are equal to each other.

With such a control, even if the scene being imaged changes, the temperatures of the reference heat source A 1350 and the reference heat source B 1360 change according to the average value of the temperature of the obtained image, and are always controlled within a predetermined temperature range (average value Δt). Correction means 1460 obtains a correction coefficient used for correcting output variations, based on the output of the infrared detector 1340 while imaging the reference heat source A 1350 and the reference heat source B 1360 during the ineffective scanning period. In this way, a temperature calibration suitable for the temperature range to be measured is realized.

FIG. 11 is a diagram illustrating another exemplary configuration of a conventional infrared imaging device (described in Japanese Laid-Open Patent Publication No. 10-142065). The configuration of FIG. 11 is used for the purpose of eliminating two-dimensional output variations.

In FIG. 11, first shutting means 1510 is provided for shading correction, and second shutting means 1530 is provided for inter-pixel output variation correction. During an imaging operation, the first and second shutting means 1510 and 1530 are open, whereby an infrared radiation coming through an optical system 1520 forms an image on an infrared detector 1540.

The first shutting means 1510 is closed by a control means 1560 once in every 30 seconds so as to shut off the infrared radiation. In this state, inter-pixel output variation correction means 1550 determines a shading correction value based on the output of the infrared detector 1540. On the other hand, the second shutting means 1530 is also closed by the control means 1560 once in every 30 seconds so as to shut off the infrared radiation. In this state, the inter-pixel output variation correction means 1550 determines a sensitivity correction value based on the output of the infrared detector 1540.

PROBLEMS TO BE SOLVED BY THE INVENTION

In order to obtain, with a good precision, the temperature information of the object by using an infrared imaging device, it is necessary to perform two types of image correction. One is a so-called "temperature calibration", i.e., a calibration of the relationship between the output signal (brightness signal) and the temperature, and the other is a correction of two-dimensional output variations in the image.

Possible factors necessitating the temperature calibration include changes in characteristics due to changes in the temperature of the infrared detector itself, fluctuations in the amount of infrared radiation from an optical system such as a lens or a lens barrel due to changes in temperature, etc. For example, when an infrared imaging device is used outdoors, there are violent temperature changes, whereby even immediately after a temperature calibration, the correspondence between the temperature and the brightness shifts from the actual values, thereby reducing the, legibility of the image. Moreover, when it rains, the brightness level substantially decreases for the same object being imaged due to a temperature decrease.

There are two factors for two-dimensional output variations. One is sensitivity variations among various pixels of an infrared detector, and non-uniformities are introduced to the surface of an infrared image by such sensitivity variations. The other is what is called "lens shading", which is a phenomenon wherein the amount of light received by a central portion of the infrared detector is uniformly higher than that received by a peripheral portion thereof, due to the nature of the optical system.

In the conventional example of FIG. 8, the temperature in the vicinity of the infrared detector 1010 is measured, and an object temperature versus brightness table is referenced based on the vicinity temperature. However, in the case of imaging with an infrared imaging device being installed outdoors, for example, the temperature of an optical system 1020 is substantially different from the temperature in the vicinity of the infrared detector 1010, whereby the amount of infrared radiation from the optical system 1020 during an imaging operation is substantially different from that-when the table is created. As a result, it is not always possible to realize a high precision temperature compensation.

In the conventional example of FIG. 10, the heat sources serving as references for the temperature calibration are provided between the optical systems. Therefore, in the case of imaging with an infrared imaging device being installed outdoors, for example, there are violent fluctuations in the temperature of the optical systems, and the calibration cannot be performed with the influence of the fluctuations in the temperature of the optical systems being taken into consideration. Particularly, the fluctuations in the infrared radiation from the optical system 1310 on the outer side with respect to the heat sources are substantial, thereby fluctuating, the apparent measured temperature of the object.

Moreover, the conventional example of FIG. 11, despite the complicated configuration with two shutting means, can only correct two-dimensional output variations, and cannot calibrate the relationship between the output signal and the temperature. Moreover, since the timing at which to perform a correction is fixed, it is not suitable for use as a surveillance camera, or the like, because there are periods during which an imaging operation cannot be performed.

As described above, conventional infrared imaging devices have not necessarily succeeded in realizing a high precision image correction. Particularly, serious problems arise when they are used under environments with violent changes such as when they are installed in a vehicle.

DISCLOSURE OF THE INVENTION

An object of the present invention is to provide an infrared imaging device with a simple structure capable of realizing an image correction with a higher precision than in the prior art.

Specifically, the present invention provides an infrared imaging device, including: an infrared detector; an optical system for causing an infrared radiation from an object to form an image on the infrared detector; shutting means configured so that the shutting means can be opened/closed and so as to shut off an infrared radiation coming into the optical system when the shutting means is closed; and correction means for correcting an output of the infrared detector, wherein the correction means determines a correction coefficient for correcting fluctuations in an amount of infrared radiation from the optical system by using an output of the infrared detector imaging the shutting means while the shutting means is closed.

According to the present invention, the shutting means is provided for shutting off, when it is closed, the infrared radiation coming into the optical system, and the correction coefficient for correcting the fluctuations in the amount of infrared radiation from the optical system while the shutting means is closed. Therefore, it is possible to perform a correction with the fluctuations in the radiation from the optical system being taken into consideration. Therefore, it is possible to realize an image correction with a higher precision than in the prior art.

It is preferred that the correction means in the infrared imaging device according to the present invention determines a second correction coefficient for correcting variations in a DC offset among pixels and fluctuations in an amount of infrared radiation from the optical system by using the output of the infrared detector imaging the shutting means being closed and a first correction coefficient proportional to a sensitivity of each pixel of the infrared detector and shading.

It is preferred that the infrared imaging device includes second shutting means configured so that the second shutting means can be opened/closed and so as to shut off an infrared radiation coming into the optical system when the second shutting means is closed; and the correction means determines the first correction coefficient by using the output of the infrared detector imaging the shutting means being closed and an output of the infrared detector imaging the second shutting means being closed.

It is preferred that the infrared imaging device includes temperature setting means for setting a temperature of the shutting means; and the correction means determines the first correction coefficient by using an output of the infrared detector imaging the shutting means being closed, which has been set to a first temperature by the temperature setting means, and an output of the infrared detector imaging the shutting means being closed, which has been set to a second temperature by the temperature setting means.

It is preferred that the infrared imaging device according to the present invention includes temperature measurement means for measuring a surface temperature of the shutting means; and the correction means determines the correction coefficient by using a temperature measured by the temperature measurement means.

It is preferred that the optical system in the infrared imaging device according to the present invention is set to a non-focused state while the shutting means is closed.

It is preferred that the shutting means in the infrared imaging device according to the present invention is a flat-plate member having a uniform temperature distribution.

It is preferred that the infrared imaging device according to the present invention includes temperature setting means for setting a temperature of the shutting means; and the temperature setting means sets the temperature of the shutting means to a temperature in a vicinity of a temperature of a particular object to be imaged while the shutting means is closed.

The present invention also provides an infrared imaging device to be installed in a moving, object, the infrared imaging device including: an infrared detector; correction means for correcting an output of the infrared detector; and control means for controlling a timing at which the correction means determines a correction coefficient based on a signal sent from at least one of the following means provided in the moving object: means for detecting a speed of the moving object; means for identifying a traffic signal of a traffic light located in a traveling direction of the moving object; and means for determining presence/absence of an object to be detected in the traveling direction of the moving object.

According to the present invention, when the infrared imaging device is installed in a moving object, the timing at which to determine the correction coefficient is controlled based on at least one of the following: the speed of the moving object; the traffic signal of the traffic light located in the traveling direction of the moving object; and the presence/absence of an object to be detected in the traveling direction of the moving object. Therefore, it is possible to determine the correction coefficient at appropriate timings.

The present invention also provides a vehicle having the infrared imaging device according to the present invention, the vehicle including means for detecting a speed of the vehicle, wherein the control means provided in the infrared imaging device receives an output signal of the speed detection means to control the timing at which to determine the correction coefficient. Alternatively, the vehicle includes means for identifying a traffic signal of a traffic light located in a traveling direction of the vehicle, wherein the control means provided in the infrared imaging device receives an output signal of the traffic light identification means to control the timing at which to determine the correction coefficient. Alternatively, the vehicle includes means for determining presence/absence of an object to be detected in a traveling direction of the vehicle, wherein the control means provided in the infrared imaging device receives an output signal of the object determination means to control the timing at which to determine the correction coefficient.

The present invention also provides an infrared imaging device to be installed in a vehicle, the infrared imaging device including an infrared detector; an optical system for causing an infrared radiation from an object to form an image on the infrared detector; and a temperature retaining structure for stabilizing a temperature in a vicinity of the infrared detector and the optical system by using a mechanism in the vehicle.

According to the present invention, when the infrared imaging device is installed in a vehicle, the temperature in the vicinity of the infrared detector and the optical system is stabilized by the temperature retaining structure using a mechanism in the vehicle. In this way, fluctuations of the image quality are suppressed.

It is preferred that the temperature retaining structure circulates an engine coolant of the vehicle in the vicinity of the infrared detector and the optical system.

The present invention also provides a vehicle, including: an infrared imaging device; and a temperature retaining structure for stabilizing a temperature in a vicinity of the infrared imaging device by using a mechanism in the vehicle.

It is preferred that the temperature retaining structure circulates an engine coolant of the vehicle in the vicinity of the infrared imaging device.

The present invention also provides an infrared imaging device to be installed in a vehicle, the infrared imaging device including a mechanism for setting/changing a imaging direction of the infrared imaging device, wherein the mechanism sets the imaging direction toward outside of the vehicle during a normal operation, and sets the imaging direction toward a part of the vehicle, which is to be a temperature reference, during a calibration operation.

The present invention also provides a vehicle, including: an infrared imaging device; and a mechanism for setting/changing a imaging direction of the infrared imaging device, wherein the mechanism sets the imaging direction toward outside of the vehicle during a normal operation, and sets the imaging direction toward a part of the vehicle, which is to be a temperature reference, during a calibration operation.

With such configurations of the present invention, an infrared imaging device installed in a vehicle can calibrate temperature characteristics without providing a special temperature reference.

The present invention also provides an infrared image adjustment device for adjusting a display temperature range of an infrared image, including: first means for detecting, from the infrared image, an upper limit and a lower limit of a temperature range suitable for displaying the infrared image; second means for storing a predetermined temperature based on a particular object to be imaged; and third means for setting the display temperature range so as to include at least the predetermined temperature, based on the upper and lower limit temperatures detected by the first means and the predetermined temperature stored in the second means.

According to the present invention, since the predetermined temperature based on the particular object to be imaged is included in the display temperature range, the display brightness of the infrared image does not fluctuate even in cases where the object to be imaged appears and disappears in the obtained image. Therefore, it is possible to display a stable image, whereby a detailed classification operation, or the like, using an infrared image pattern can be realized.

In the infrared imaging device according to the present invention, the second means stores, as the predetermined temperature, an upper limit and a lower limit of a temperature range based on the particular object to be imaged; and the third means sets, as an upper limit of the display temperature range, a larger one of the upper limit temperature detected by the first means and the upper limit temperature stored in the second means, while setting, as a lower limit of the display temperature range, a smaller one of the lower limit temperature detected by the first means and the lower limit temperature stored in the second means.

The first means in the infrared imaging device according to the present invention detects a highest temperature and a lowest temperature among temperatures indicated by the infrared image as an upper limit and a lower limit, respectively, of the temperature range.

BEST MODE FOR CARRYING OUT THE INVENTION

FIRST EMBODIMENT

Figure 1:
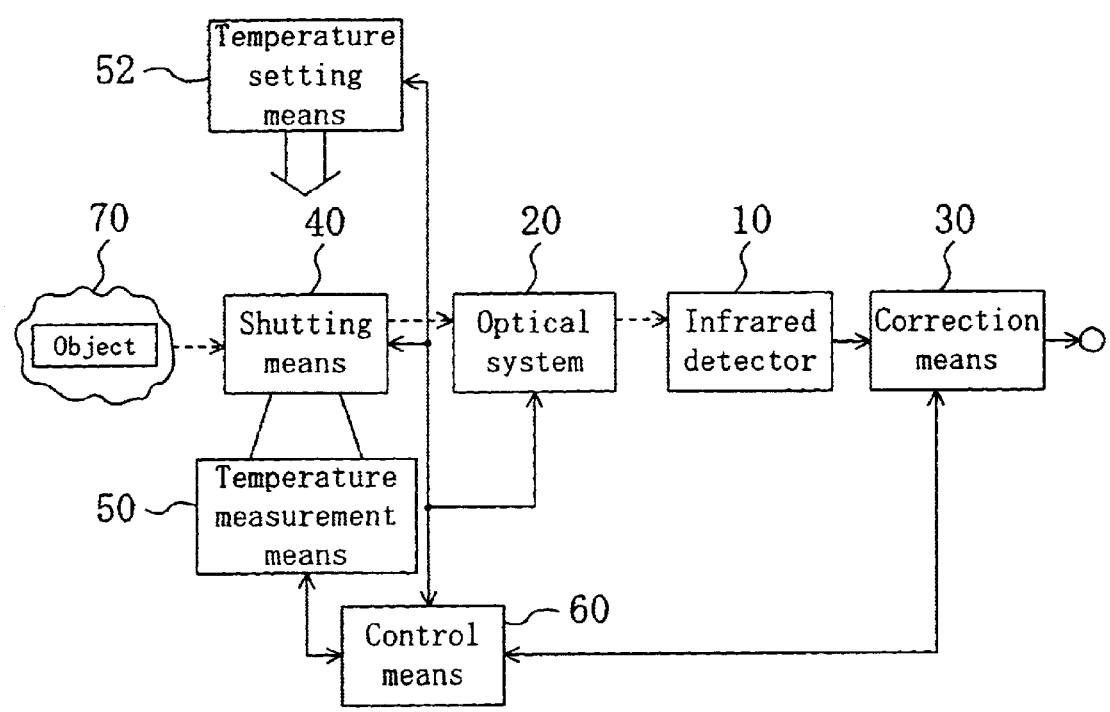
FIG. 1 is a block diagram illustrating a configuration of an infrared imaging device according to the first embodiment of the present invention.

FIG. 1 is a block diagram illustrating a configuration of an infrared imaging device according to the first embodiment of the present invention. In FIG. 1, 10 is an infrared detector such as a microbolometer for detecting an infrared radiation, 20 is an optical system having a lens for causing an infrared radiation from an object 70 to form if an image on the infrared detector 10, and 30 is correction means 30 for correcting the output of the infrared detector 10. Shutting means 40 is configured so that it can be opened/closed and so as to shut off the infrared radiation coming from the object 70 into the optical system 20 when it is closed. Temperature measurement means 50 measures the surface temperature of the shutting means 40. Control means 60 controls the open/closed state of the shutting means 40, and also controls the optical system 20, the correction means 30 and the temperature measurement means 50.

Herein, it is assumed that the infrared detector 10 is a two-dimensional area sensor having pixels in a two-dimensional arrangement. Temperature setting means 52 will be described later.

The operation of the infrared imaging device having such a configuration will now be described.

First, while imaging the object 70, the shutting means 40 is closed by a control of the control means 60. Therefore, an infrared radiation from the object 70 is caused by the optical system 20 to form an image as an infrared image on the infrared detector 10. The infrared detector 10 outputs a signal according to the amount of light received by each pixel. The output of the infrared detector 10 is corrected by the correction means 30. The correction means 30 corrects the sensitivity variations among pixels, the DC offset variations among pixels, the shading effect of the lens, and the influence of the infrared radiation from the optical system 20.

Next, the correction method of the correction means 30 will be described.

Figure 2:
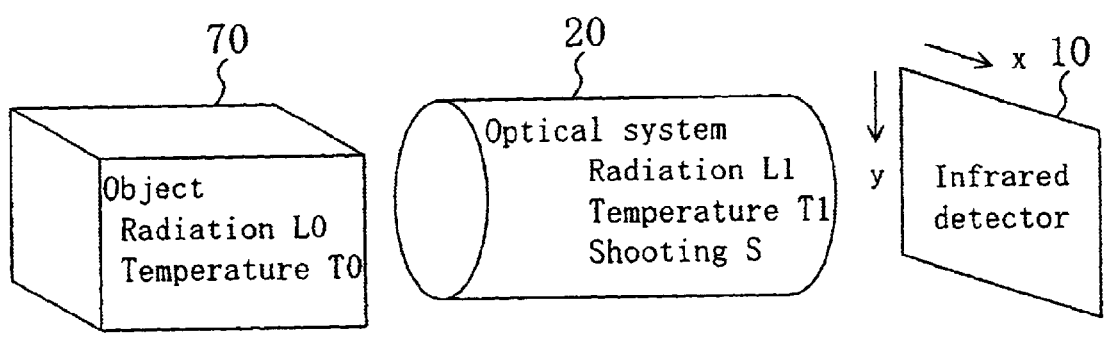
FIG. 2 is a diagram showing a model for illustrating a calibration method according to the first embodiment of the present invention.

FIG. 2 is a diagram showing a model for illustrating a calibration method according to the present embodiment. In the model of FIG. 2, the following values are defined for the pixel coordinates (x,y) of the infrared detector 10.

Radiation of object 70: $L0(x,y,T0)$
Radiation of;optical system 20: $L1(x,y,T1)$ Lens shading: $S(x,y)$
output of infrared detector 10: $e(x,y)=a(x,y)Ltotal+b(x,y)a$
$a(x,y)$: Sensitivity of pixel (x,y)
$b(x,y)$: DC offset of pixel (x,y)

Herein, in the model of FIG. 2, the following expression holds:

$$e(x,y,T0)=a(x,y)\cdot(S(x,y)\cdot L0(x,y,T0)+L1(x,y,T1))+b(x,y) \quad (1)$$

1) Determination of First Correction Coefficient

Flat objects 70 having a uniform distribution at temperatures Ta and Tb, respectively, are imaged so as to obtain the difference in the output of the infrared detector 10 therebetween.

$$e(x,y,Ta)-e(x,y,Tb)=a(x,y)\cdot S(x,y)\cdot(L0(x,y,Ta)-L0(x,y,Tb)) \quad (2)$$

Within a narrow ordinary temperature range (e.g., 0° C. to 60° C.), the infrared radiation L0 can be approximated by a linear function of the temperature T0 as in the following expression:

$$L0(x,y,T0)=c\cdot T0+d \quad (3)$$

Herein, c and d are constants. Substitute Expression (3) into Expression (2) and divide each side by the temperature difference (Ta–Tb) to obtain a first correction coefficient G(x,y). Thus, $$G(x,y)=(e(x,y,Ta)-e(x,y,Tb))/(Ta-Tb)=a(x,y)\cdot S(x,y)\cdot c \quad (4)$$

Then, the obtained first correction coefficient G(x,y) is stored in the correction means 30.

As can be seen from Expression (4), the first correction coefficient G(x,y) is proportional to the sensitivity (gain) of each pixel and the lens shading. By using the first correction coefficient G(x,y), it is possible to correct the influence of the lens shading effect and the sensitivity variations among pixels.

Note that the sensitivity variations among pixels are caused primarily by variations in the processing dimension among pixels during the manufacture process, and do not substantially change after the device is manufactured. Therefore, the determination of the first correction coefficient G(x,y) does not need to be performed periodically during use of the device, and needs to be performed only once when the device is manufactured particularly in cases where the optical system 20 of a fixed focus type is used.

2) Determination of Second Correction Coefficient

At start-up of the infrared imaging device, or after a long-time imaging operation, image non-uniformities or fluctuations in the average brightness level occur because of the temperature variations of the optical system 20 and/or slight output variations among pixels of the infrared detector 10 due to temperature fluctuations. When such phenomena occur, the control means 60 is manually activated so as to determine a second correction coefficient for correcting the output variations among pixels.

First, the shutting means 40 is closed from the open state by a control signal from the control means 60, thereby shutting off the infrared radiation coming into the optical system 20. Then, an average temperature Tc of the shutting means 40 is measured by the temperature measurement means 50. At this time, the optical system 20 is preferably set to a non-focused state. Moreover, it is preferred that the shutting means 40 is a flat-plate member having a uniform temperature distribution. When the focal point of the optical system 20 is at a distance of a few meters or more, the shutting means 40, which is placed immediately before the optical system 20, forms an image on the infrared detector 10 in a defocused state. Herein, the second correction coefficient H(x,y) expressed as $$H(x,y)=K-e(x,y,Tc)/G(x,y) \quad (5)$$

is obtained, and stored in the correction means 30. K is a constant. Thus, the second correction coefficient H(x,y) is obtained so that the outputs from all pixels are uniform when imaging the shutting means 40 at the temperature Tc.

The second correction coefficient H(x,y) is a correction coefficient for correcting DC offset variations among pixels and fluctuations in the amount of infrared radiation from the optical system 20 (DC component variations). Now, by dividing both sides of Expression (1) by both sides of the Expression (4), respectively, it is possible to eliminate the influence of the lens shading and the sensitivity variations among pixels. What remains there is only the influence of DC component variations.

$$e(x,y,T0)/G(x,y)=L0(x,y,T0)/c+L1(x,y,T1)/c \cdot S(x,y)+b(x,y)/G(x,y) \quad (6)$$

In Expression (6), the first term of the right side represents the radiation of the object 70, and the second term and the third term represent the DC component, which varies among pixels. Of the terms representing the DC component, what is varied by environmental fluctuations is the term of the radiation L1 of the optical system 20. This term varies according to the temperature T1 of the optical system 20. Therefore, it is desirable that the second correction coefficient H(x,y) is updated each time the temperature T1 of the optical system 20 changes.

3) Correction of Imaging Signal

During an imaging operation, imaging signals are corrected as follows. The control means 60 opens the shutting means 40, and starts imaging the object 70. At this time, the correction output signal E(x,y,T0) is obtained as in the following expression:

$$E(x,y,T0)=e(x,y,T0)/G(x,y)+H(x,y) \quad (7)$$

At this time, $$dE/dT0=c^2 \quad (8)$$

Thus, the correction output E increases by $c^2$ for each 1-degree increase in the temperature of the object 70. Since E=K when T0=Tc, $$E(x,y,T0)=c^2 \cdot (T0-Tc)+K \quad (9)$$

Rearranging the expression with respect to T0 gives $$T0=(E(x,y,T0)-K)/c^2+Tc \quad (10)$$

Herein, $c^2$ is a constant that is not fluctuated by the environment.

The correction output signal E(x,y,T0) ensures that Expression (10) holds as long as the temperature of the optical system 20 is constant both upon determination of the second correction coefficient H(x,y) and upon imaging of the object while the infrared radiation from the object 70 does not fluctuate. Thus, the correction output signal E(x,y,T0) is a signal representing the two-dimensional temperature distribution of the object 70 with the output variations among pixels being corrected. The correction means 30 converts the correction output signal E(x,y,T0) into a video image signal of a dynamic range suitable for display, and outputs the video image signal.

Thereafter, if the temperature of the optical system 20 changes due to external temperature fluctuations or heat radiation of the internal electric circuits, etc., thereby causing non-uniformities to be introduced into the image and/or increasing the difference between the actual temperature and the temperature calculated from the imaging signal, the control means 60 may be activated to update the second correction coefficient H(x,y) again. Therefore, it is desirable to start imaging the object before the temperature of the optical system 20 substantially changes after updating the second correction coefficient H(x,y).

Moreover, the temperature setting means 52 for setting the temperature of the shutting means 40 may be provided. The temperature setting means 52 can be easily implemented by, for example, a combination of a heater and a temperature sensor. By using the temperature setting means 52, it is possible to set the temperature Tc of the shutting means 40 to a desired value when obtaining the second correction coefficient H(x,y). The temperature Tc of the shutting means 40 at this time is preferably set to a temperature in the vicinity of the temperature of the particular object to be imaged (e.g., a "human").

Moreover, the shutting means 40 may be used also when setting the first correction coefficient G(x,y). In such a case, the shutting means 40 can be imaged while being closed and set to the first temperature Ta using the temperature setting means 52, and then imaged while being closed and set to the second temperature Tb.

Figure 3:
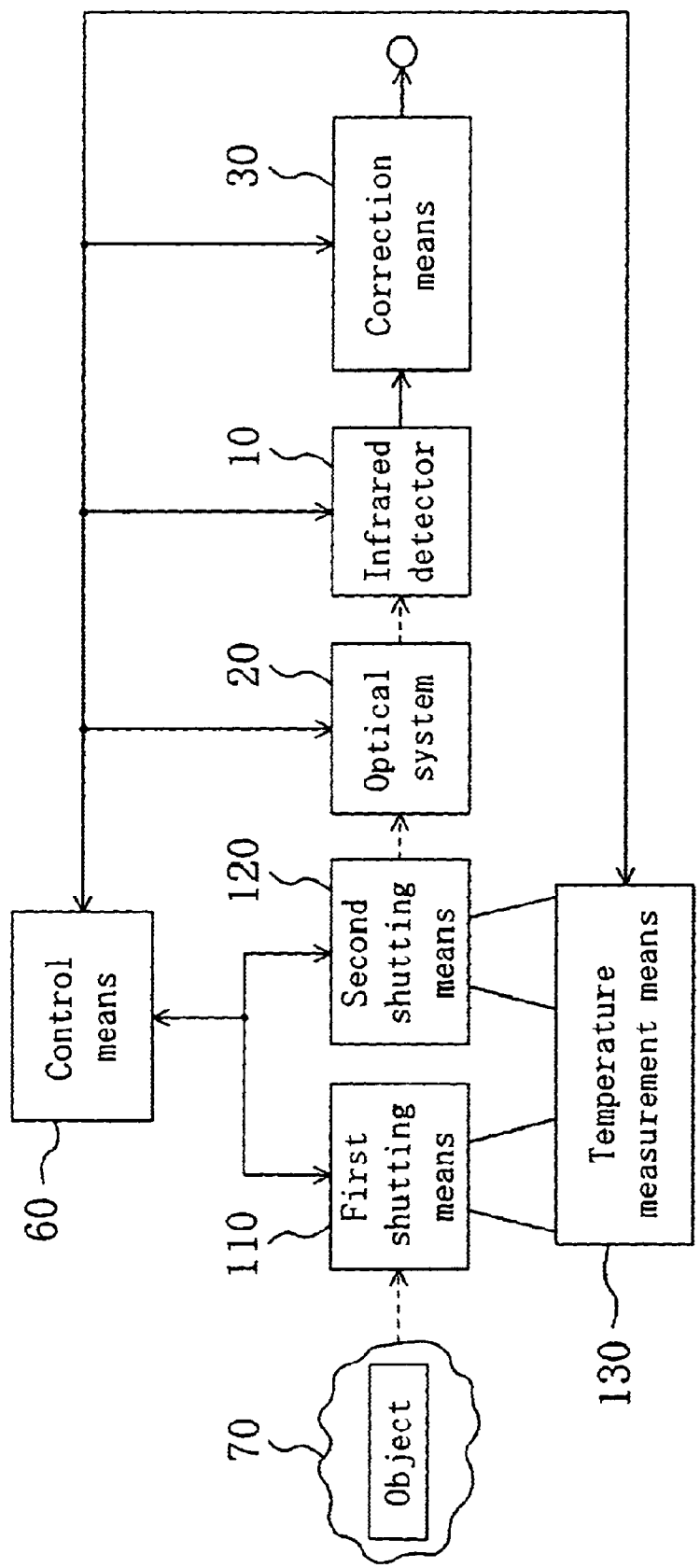
FIG. 3 is a diagram illustrating an alternative example of the configuration of FIG. 1.

FIG. 3 is a diagram illustrating an alternative example of the infrared imaging device according to the first embodiment of the present invention. In the configuration of FIG. 3, two shutting means 110 and 120 are provided as means for shutting off an infrared radiation coming into the optical system 20. The temperature measurement means 130 is configured so that it can measure the temperature of each of the first and second shutting means 110 and 120.

With the configuration of FIG. 3, the first and second shutting means 110 and 120 can be used for setting the first correction coefficient G(x,y). Specifically, first, the output of the infrared detector 10 while imaging the first shutting means 110 having the uniform first temperature Ta, with the second shutting means 120 being open and the first shutting means 110 being closed, is stored. Then, the output of the infrared detector 10 while imaging the second shutting means 120 having the uniform second temperature Tb, with the first shutting means 110 being open and the second shutting means 120 being closed, is stored. Then, the first correction coefficient G(x,y) can be obtained by a method as described above using the stored output signals.

Note that the temperature calibration may be performed using the shutting means 40 by another method other than the calibration method described above in the present embodiment. By using the shutting means 40 for shutting off the infrared radiation coming into the optical system 20, it is possible to realize a correction with the influence of the radiation of the optical system 20 being taken into consideration.

Alternatively, the temperature measurement means 50 may not be provided. When the temperature measurement means 50 is not provided, the temperature Tc of the shutting means 40 when obtaining the second correction coefficient H(x,y) is unknown, whereby the temperature T0 of the object 70 cannot be obtained by using Expression (9). However, the relative temperature versus brightness characteristics can be obtained more accurately than in the prior art. Specifically, in Expression (6), the characteristics variations among pixels due to shading of the optical system 20 are corrected by the first term of the right side, and the fluctuations in the radiation from the optical system 20 are corrected by the second term of the right side. In this way, the effect of shading and the fluctuations in the radiation from the optical system 20 can be corrected individually, whereby it is possible to obtain more accurate relative temperature versus brightness characteristics.

SECOND EMBODIMENT

Figure 4A:
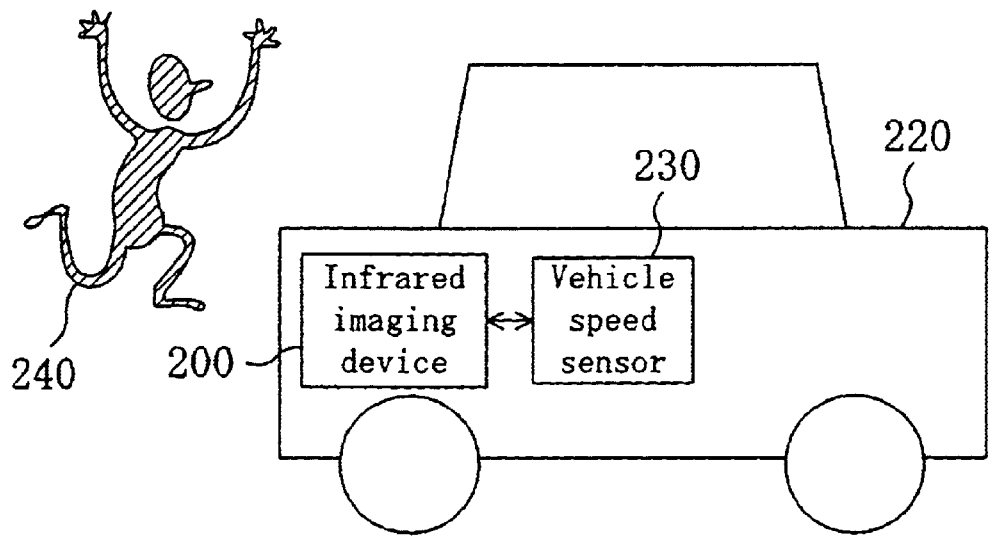
FIG. 4 is a diagram illustrating a configuration of a vehicle having an infrared imaging device according to the second embodiment of the present invention installed therein.
Figure 4B:
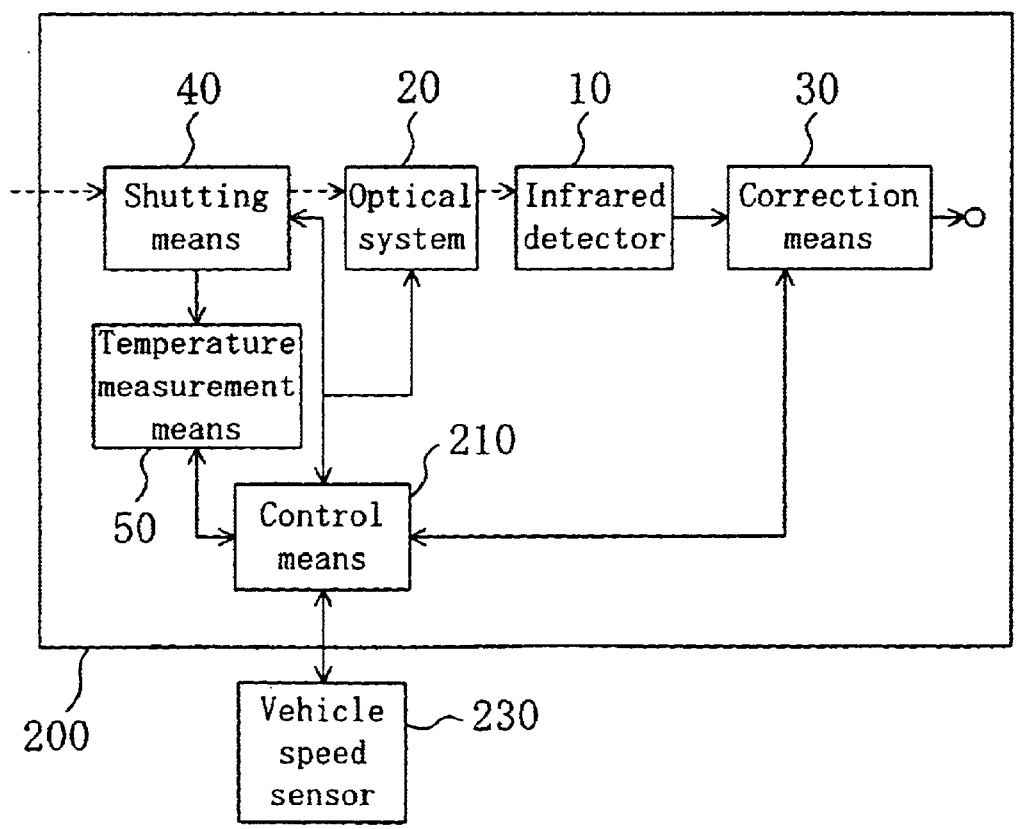

FIG. 4 is a diagram illustrating a general configuration of a vehicle having an infrared imaging device according to the second embodiment of the present invention installed therein. In FIG. 4, those elements that are also shown in FIG. 1 are provided with the same reference numerals as in FIG. 1. As illustrated in FIG. 4(*b*), an infrared imaging device 200 illustrated in FIG. 4(*a*) installed in a vehicle 220, as a moving object, has substantially the same configuration as that of the first embodiment. The infrared imaging device 200 is installed for imaging on the front side of the vehicle 220 with respect to the traveling direction thereof in order to detect an object 240 (a human or another vehicle) on the front side with respect to the traveling direction. An output signal of a vehicle speed sensor 230, as means for detecting the speed of the vehicle 220, is provided to control means 210 of the infrared imaging device 200.

When the infrared imaging device 200 is installed in the vehicle 220, it is subject to the influence of the weather, the temperature, the traveling speed, etc., whereby the temperature of the optical system 20 thereof fluctuates easily. Therefore, the second correction coefficient H(x,y) illustrated in the first embodiment needs to be updated frequently. Since a normal imaging operation cannot be performed while updating the correction coefficient, it is not preferable to update the correction coefficient frequently while the vehicle 220 is running.

In view of this, the present embodiment uses the output signal of the vehicle speed sensor 230 so that the correction coefficient is updated during a period in which the vehicle 220 is at a stop or during a period in which the vehicle 220 is running at a very low speed. In this way, the calibration is performed only when there is substantially no possibility of hitting an obstacle, thereby realizing a temperature calibration without losing the meaning of providing the infrared imaging device.

Specifically, the calibration is performed as in the first embodiment. That is, the first correction coefficient G(x,y) is obtained in advance when the infrared imaging device 200 is manufactured. Then, when it is detected from the output signal of the vehicle speed sensor 230 that the vehicle 220 has come to a stop or the speed thereof has become less than or equal to a predetermined value, the shutting means 40 is closed and the second correction coefficient H(x,y) is updated.

Note that also with other correction methods, it is preferred that the timing at which to perform the calibration is controlled by using the output signal of the vehicle speed sensor 230 as in the present embodiment. Moreover, the device can be used with a moving object other than a vehicle, e.g., a train, a ship, an airplane, etc.

THIRD EMBODIMENT

Figure 5:
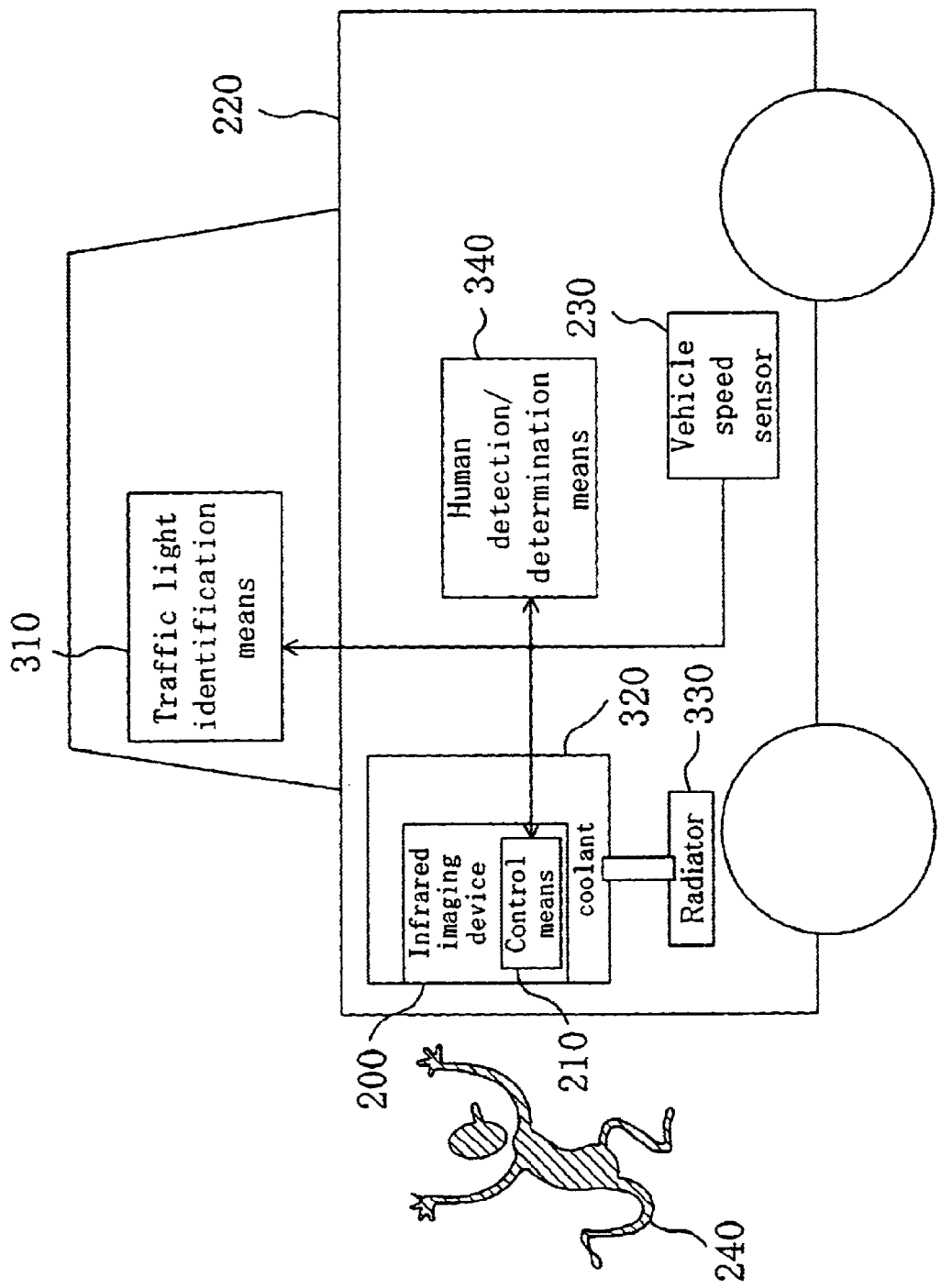
FIG. 5 is a diagram illustrating a configuration of a vehicle having an infrared imaging device according to the third embodiment of the present invention installed therein.

FIG. 5 is a diagram illustrating a general configuration of a vehicle having an infrared imaging device according to the third embodiment of the present invention installed therein. In FIG. 5, those elements that are also shown in FIG. 4 are provided with the same reference numerals as in FIG. 4. The infrared imaging device 200 employs a configuration of FIG. 4(*b*).

In FIG. 5, the infrared imaging device 200 installed in the vehicle 220 receives, at the control means 210, an output signal of means 310 for identifying the traffic signal of a traffic light located in the traveling direction and an output signal of means 340 for determining the presence/absence of a human, as a detection object, in the traveling direction, in addition to the output signal of the vehicle speed sensor 230. The traffic light identification means 310 detects the position of a traffic light from the camera image and determines the color of the light that is turned ON. Moreover, the human detection/determination means 340 extracts an image of a predetermined temperature range from the infrared image, and determines the presence/absence of a human based on the size, the shape, etc., of the image.

In the present embodiment, the traffic light identification means 310 or the human detection/determination means 340 are used, in addition to the vehicle speed sensor 230, for controlling the calibration timing. In this way, it is possible to reliably ensure activation of the infrared imaging device 200 when the operation thereof is needed. For example, the infrared imaging device 200 is designed so that it updates the correction coefficient only when the vehicle speed sensor 230 detects that the traveling speed of the vehicle 220 is zero, the traffic light identification means 310 identifies that the traffic signal of the traffic light in front of the vehicle 220 indicates "STOP" to the vehicle 220, and the human detection/determination means 340 is not detecting a human. In this way, it is possible to perform a calibration only when there is substantially no possibility of hitting an obstacle in an even more reliable manner than in the second embodiment.

Moreover, in the infrared imaging device 200, a peripheral structure 320 thereof is filled with a circulating engine coolant provided from a radiator 330 of the vehicle 220. Since the temperature of a coolant is substantially constant after the vehicle 220 has been warmed up, the temperature of the infrared imaging device 200 in operation is stabilized by the peripheral structure 320, as a temperature retaining structure. This reduces the temperature fluctuations of the optical system and reduces the fluctuations in the image quality.

Note that any one or two of the vehicle sensor 230, the traffic light identification means 310 and the human detection means 340 may be used for controlling the calibration timing, or another sensor may be used in addition.

Moreover, the peripheral structure 320 may be either provided integrally with the infrared imaging device 200 or provided on the vehicle 220 side so that the infrared imaging device 200 is fitted therein. Moreover, another mechanism of the vehicle 220 may be used to realize the temperature retaining structure.

FOURTH EMBODIMENT

Figure 6:
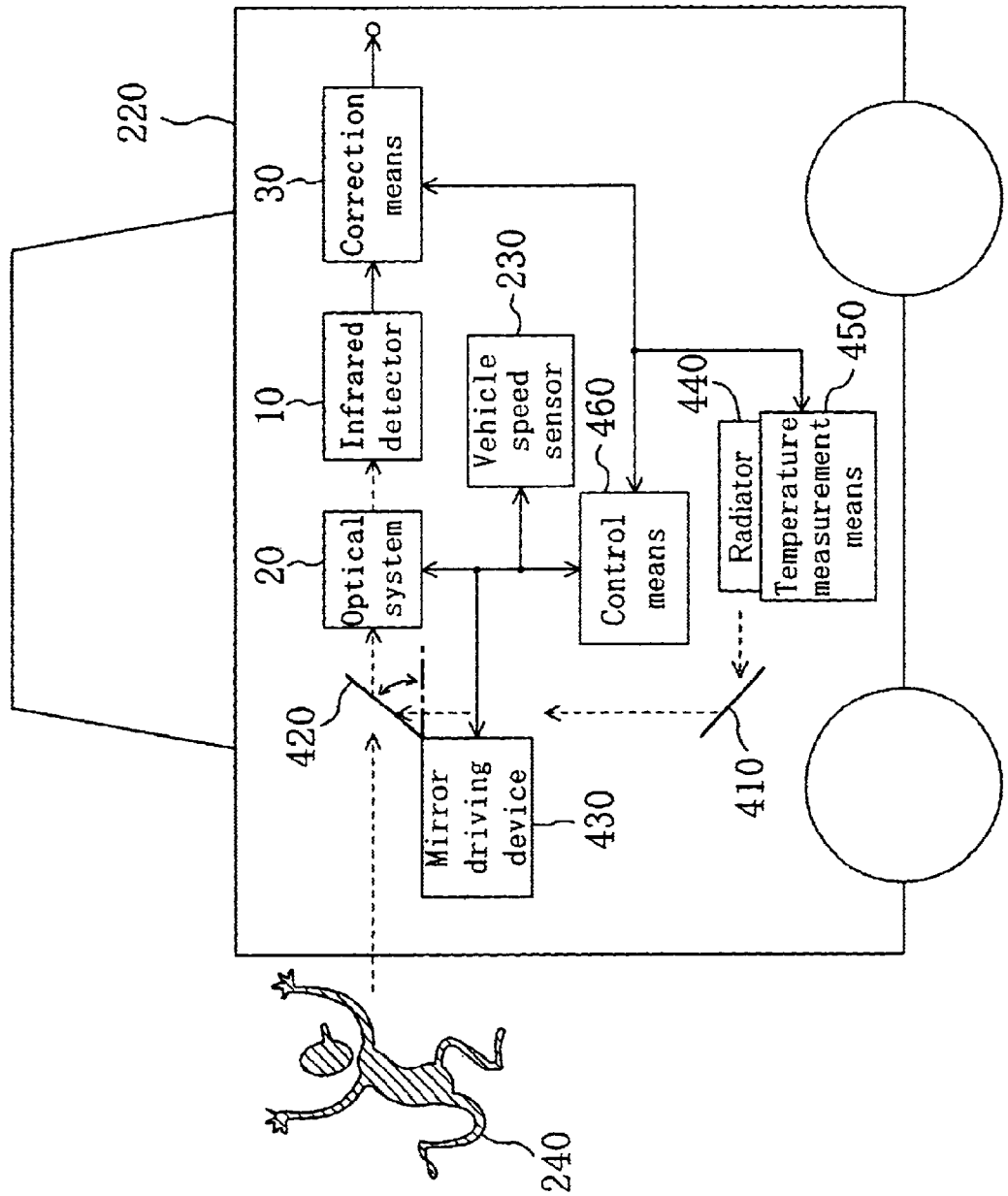
FIG. 6 is a diagram illustrating a configuration of a vehicle having an infrared imaging device according to the fourth embodiment of the present invention installed therein.

FIG. 6 is a diagram illustrating a configuration of a vehicle having an infrared imaging device according to the fourth embodiment of the present invention installed therein. In FIG. 6, those elements that are also shown in FIG. 1 and FIG. 4 are provided with the same reference numerals as in FIG. 1 and FIG. 4. In FIG. 6, 410 and 420 are mirrors for reflecting an infrared radiation of wavelengths used for imaging, 430 is a mirror driving device for controlling the direction of the mirror 420, 440 is a radiator of the vehicle 220, and 450 is temperature measurement means for measuring the temperature of the radiator 440. The angle and position of the mirror 410 are fixed. Moreover, in the configuration of FIG. 6, shutting means is not provided.

The infrared imaging device illustrated in FIG. 6 performs a calibration when the speed of the vehicle 220 detected by the vehicle speed sensor 230 is less than or equal to a predetermined value, as in the second embodiment. In the present embodiment, the radiator 440 is imaged as a temperature reference during a calibration.

During a calibration, the mirror driving device 430 sets the direction of the mirror 420 so that an infrared radiation coming from outside the vehicle 220 into the optical system 20 is shut off while an infrared radiation radiated from the radiator 440 and reflected by the mirror 410 is allowed to come into the optical system 20. In this state, a calibration as that of the first embodiment, for example, is performed. Since the temperature of the radiator 440 is kept substantially constant while the vehicle 220 is running, the radiator 440 can be used as a temperature reference in a calibration.

On the other hand, during a normal imaging operation, the mirror driving device 430 sets the direction of the mirror 420 so that an infrared radiation radiated from the radiator 440 and reflected by the mirror 410 is shut off while an infrared radiation coming from outside the vehicle 220 is allowed to come into the optical system 20.

As described above, according to the present embodiment, an infrared imaging device installed in a vehicle can calibrate temperature characteristics without providing a special temperature reference such as the shutting means provided in the first embodiment.

Note that while the radiator 440 is used as a temperature reference in the present embodiment, any other part of the vehicle whose temperature is constant may be used as a temperature reference.

Moreover, in the present embodiment, a mechanism for setting/changing the imaging direction is implemented by the mirror 420 and the mirror driving device 430. Alternatively, any other mechanism, e.g., a mechanism for changing the direction of the imaging device itself, including the infrared detector 10 and the optical system 20, may be used. Moreover, the mechanism for setting/changing the imaging direction may be either provided integrally with the infrared imaging device or provided on the vehicle side.

FIFTH EMBODIMENT

Figure 7:
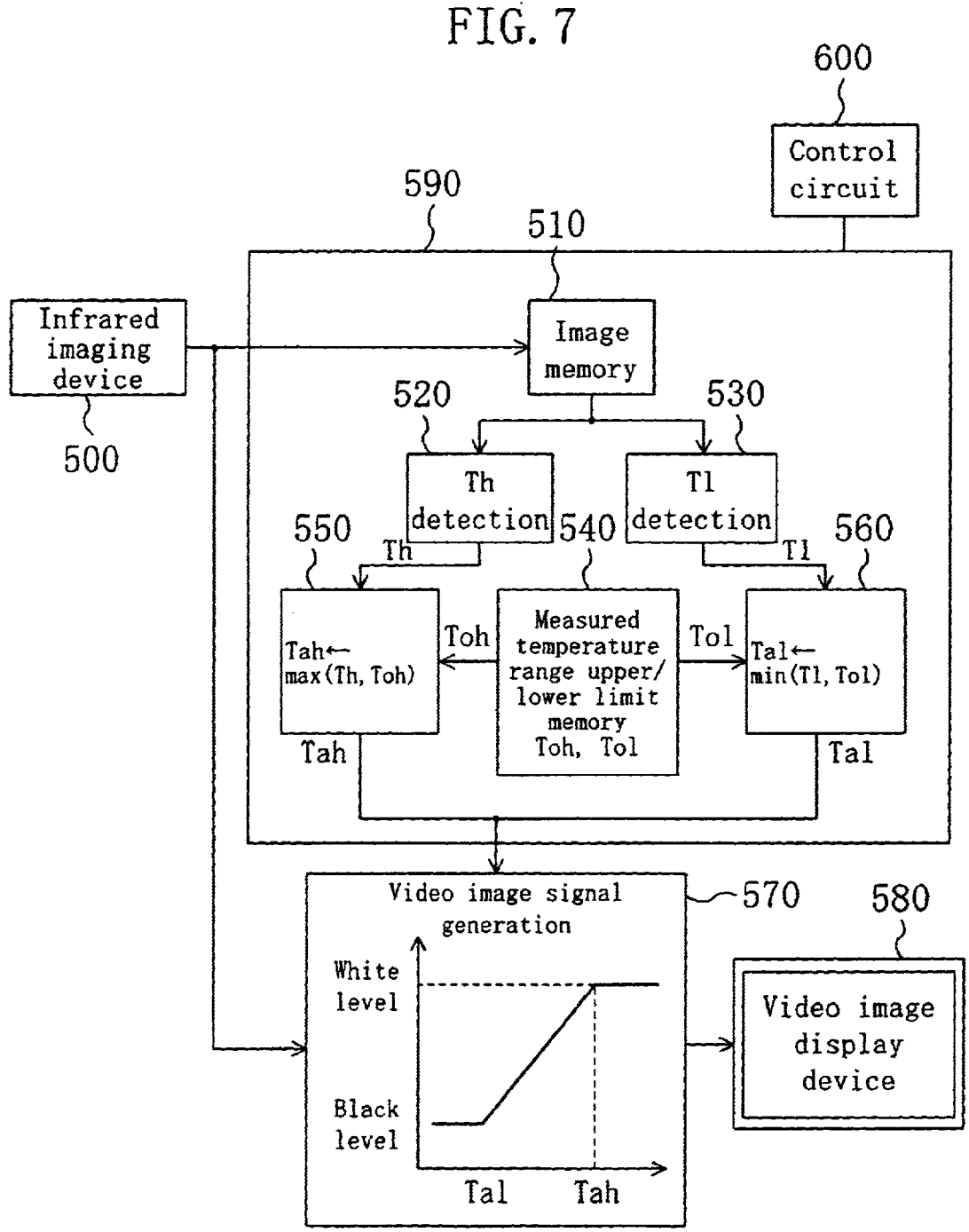
FIG. 7 is a diagram illustrating a configuration of a vehicle having an infrared imaging device according to the fifth embodiment of the present invention installed therein.
Figure 8:
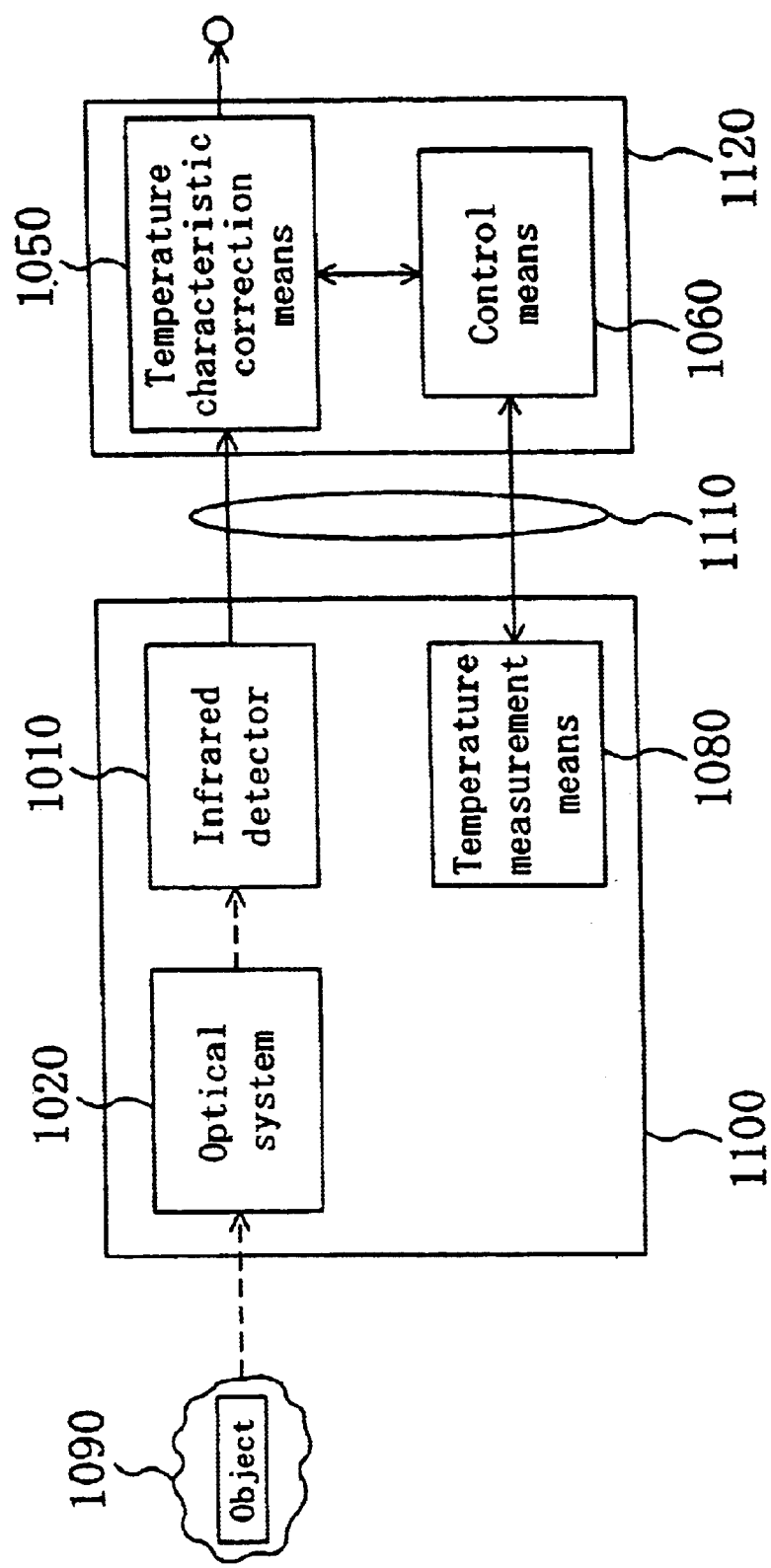
FIG. 8 is a diagram illustrating a configuration of a conventional infrared imaging device.
Figure 9:
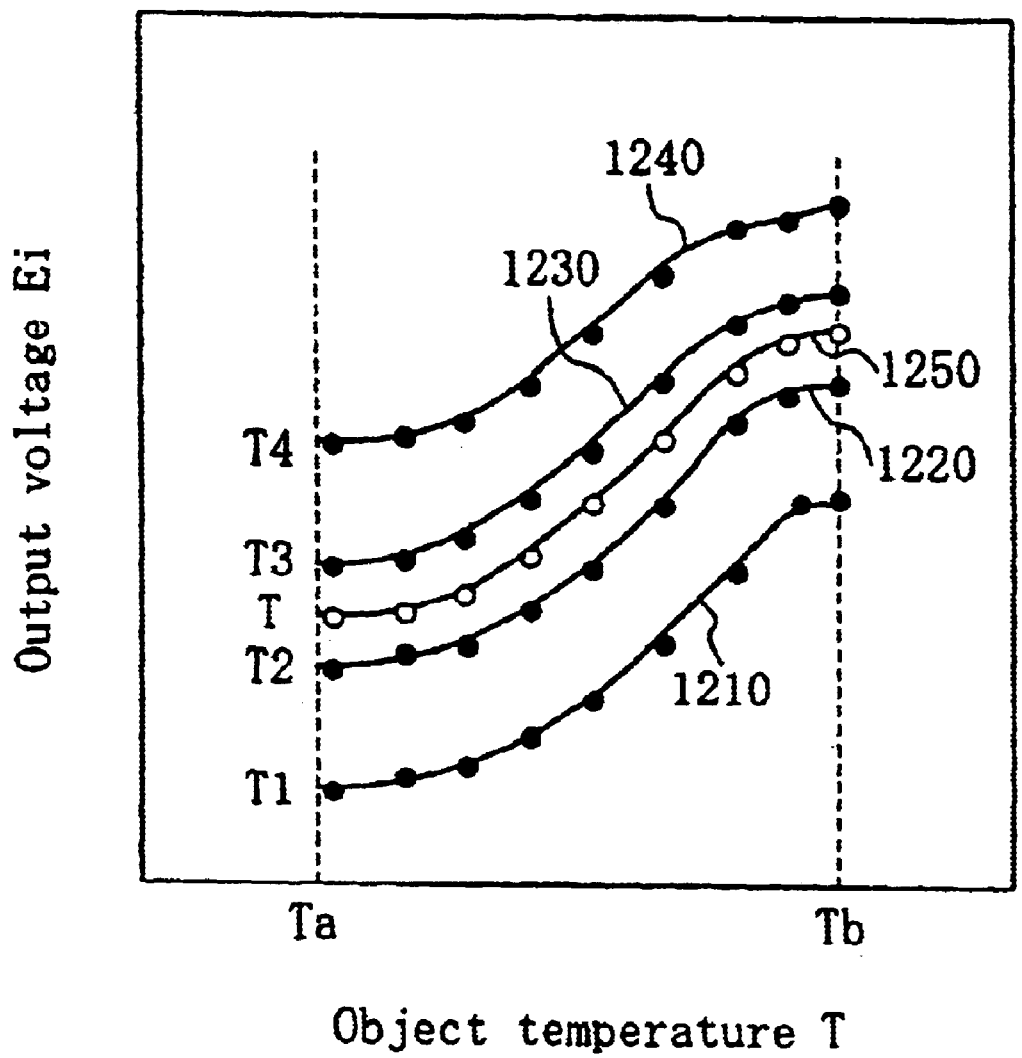
FIG. 9 is a diagram illustrating an object temperature versus brightness table of a temperature characteristic correction means of FIG. 8.
Figure 10:
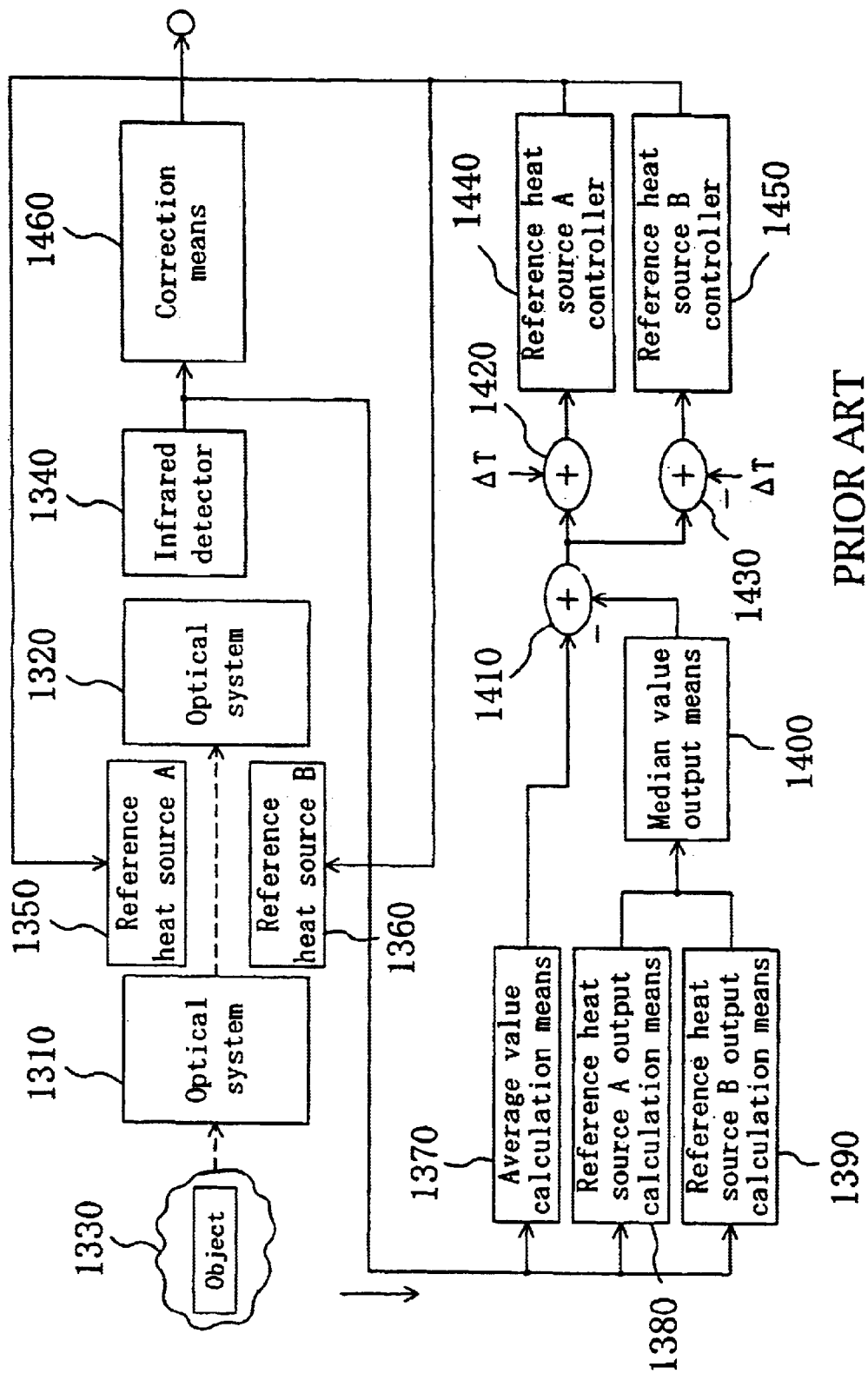
FIG. 10 is a configuration of a conventional infrared imaging device.
Figure 11:
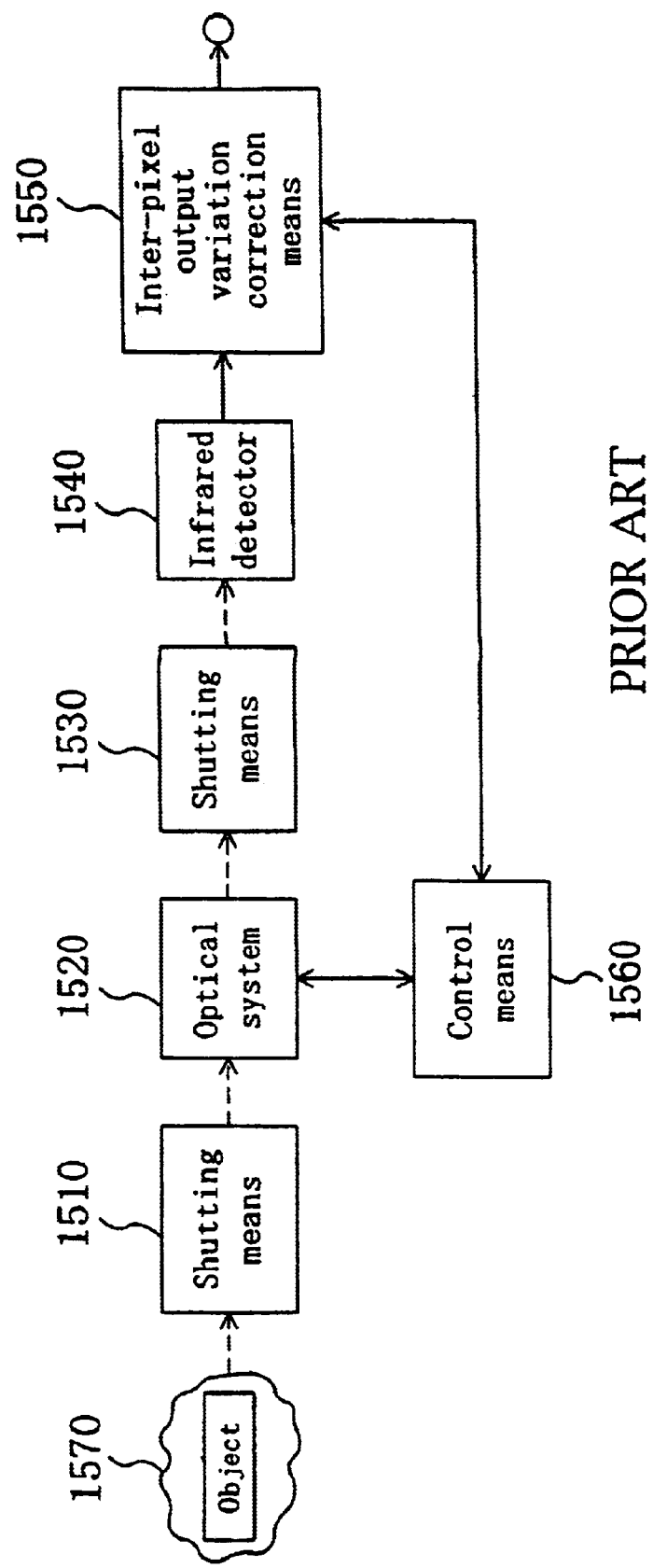
FIG. 11 is a configuration of a conventional infrared imaging device.

FIG. 7 is a diagram illustrating a configuration of an infrared image adjustment device according to the fifth embodiment of the present invention. In FIG. 7, an infrared imaging device 500 has a configuration as illustrated in FIG. 1, and it is assumed that the first correction coefficient G(x,y) and the second correction coefficient H(x,y) have already been obtained according to the procedure illustrated in the first embodiment. Thus, the correspondence between the brightness signal output from the infrared imaging device 500 and the temperature of the object is known.

An infrared image adjustment device 590 adjusts the display temperature range of an infrared image. In the infrared image adjustment device 590, 510 is an image memory for storing infrared image data, 520 is a highest temperature detection section for detecting a highest temperature Th from the infrared image data stored in the image memory 510, and 530 is a lowest temperature detection section for detecting a lowest temperature Tl from the infrared image data stored in the image memory 510. 540 is a memory storing an upper limit Toh and a lower limit Tol of the measured temperature range based on the temperature of a particular object to be imaged, 550 is a first comparison section for comparing the highest temperature Th with the upper limit Toh of the temperature range so as to selectively output the larger value, and 560 is a second comparison section for comparing the lowest temperature Tl with the lower limit Tol of the temperature range so as to selectively output the smaller value.

The image memory 510, the highest temperature detection section 520 and the lowest temperature detection section 530 together form first means, the temperature range upper/lower limit memory 540 forms second means, and the first and second comparison sections 550 and 560 together form third means. The infrared image adjustment device 590 outputs the selective outputs of the first and second comparison sections 550 and S60 as an upper limit temperature Tah and a lower limit temperature Tal, respectively, of the display temperature range.

The video image signal generation section 570 receives the output of the infrared imaging device 500 and generates a video image signal used for displaying an infrared image on a video image display device 580. At this time, the dynamic range of the video image signal is adjusted by using the upper limit temperature Tah and the lower limit temperature Tal output from the infrared image adjustment device 590 so that the upper limit temperature Tah matches the white level and the lower limit temperature Tal matches the black level.

Now, it is assumed that an imaging operation is performed by using the infrared imaging device 500 in order to detect a "human" outdoors in winter. In this case, for example, the upper limit Toh and the lower limit Tol of the measured temperature range are set to 35° C. and 30° C., respectively.

When a control circuit 600 activates the infrared image adjustment device 590, one frame of image data output from the infrared imaging device 500 is stored in the image memory 510. The highest temperature detection section 520 detects the temperature Th indicated by the highest brightness pixel in the object frame image, and the lowest temperature detection section 530 detects the temperature Tl indicated by the lowest brightness pixel in the object frame image.

When outdoors in winter, the temperature of a building, the asphalt on a road, etc., is lower than the surface temperature of a human. Thus, the following relationship:

$$Tl < Th < Tol < Toh$$

holds. Therefore, the first comparison section 550 outputs, instead of the highest temperature Th detected by the highest temperature detection section 520, the upper limit temperature Toh stored in the temperature range upper/lower limit memory 540 as the upper limit temperature Tah of the display temperature range, while the second comparison section 560 outputs the lowest temperature Tl detected by the lowest temperature detection section 530 as the lower limit temperature Tal of the display temperature range.

In this way, the temperature range of a human, which is the object to be imaged, is always included in the dynamic range of the video image signal. Therefore, even in cases where a human appears and disappears in the obtained image, the dynamic range of the video image signal does not fluctuate, and abrupt fluctuations in the brightness of a video image as those that occur due to AGC (Auto Gain Control) do not occur. Thus, a detailed classification operation, or the like, using pattern recognition, for example, can be easily realized.

Similarly, when detecting a "human" outdoors during the daytime in summer, the following relationship:

$$Tol < Toh < Tl < Th$$

usually holds. Therefore, the first comparison section 550 outputs the highest temperature Th detected by the highest temperature detection section 520 as the upper limit temperature Tah of the display temperature range, while the second comparison section 560 outputs, instead of the lowest temperature Tl detected by the lowest temperature detection section 530, the lower limit Tol stored in the temperature range upper/lower limit memory 540 as the lower limit temperature Tal of the display temperature range. In this way, the temperature range of a human, which is the object to be imaged, is always included in the dynamic range of the video image signal, and abrupt fluctuations in the brightness of a video image do not occur.

In cases where the dynamic range of the image becomes insufficient or the image is saturated due to fluctuations in the temperature of the background being imaged, the video image signal adjustment device 590 may be activated again by the control circuit 600 so as to re-set the display temperature range. Alternatively, the setting of the display temperature range may be performed for each frame image as in the case of AGC.

As described above, according to the present embodiment, a predetermined temperature range based on the temperature of a particular object to be imaged is included, in advance, in the display temperature range, whereby it is possible to display a stable infrared image even when an object to be imaged suddenly comes into the imaging range.

Note that the infrared image adjustment device 590 of the present embodiment may be either provided integrally with infrared imaging device 500 or provided integrally with the video image signal generation section 570 and the video image display device 580.

Moreover, in the present embodiment, the highest temperature and the lowest temperature of an infrared image are detected first. Alternatively, the upper limit and the lower limit of a temperature range suitable for displaying an infrared image may be detected. For example, a pixel having a brightness that is substantially different from other pixels may be excluded from the temperature detection.

Moreover, instead of setting a measured temperature range, a single predetermined temperature may be set so that the predetermined temperature is included in the display temperature range. In the present embodiment, this can be achieved easily by a setting such that Toh=Tol.

What is claimed is:

1. An infrared imaging device, comprising:

an infrared detector;

an optical system for causing an infrared radiation from an object to form an image on the infrared detector;

shutting means configured so that the shutting means can be opened/closed and so as to shut off an infrared radiation coming into the optical system when the shutting means is closed; and correction means for correcting an output of the infrared detector, wherein the correction means determines a second correction coefficient for correcting variations in a DC offset among pixels and fluctuations in an amount of infrared radiation from the optical system by using an output of the infrared detector imaging the shutting means while the shutting means is closed and the optical system is set to a non-focused state and a first correction coefficient proportional to a sensitivity of, each pixel of the infrared detector and shading.

2. The infrared imaging device of claim 1, wherein:

the infrared imaging device comprises temperature measurement means for measuring a surface temperature of the shutting means; and the correction means determines the correction coefficient by using a temperature measured by the temperature measurement means.

3. The infrared imaging device of claim 1, wherein the shutting means is a flat plate member having a uniform temperature distribution.

4. An infrared imagine device comprising:

an infrared detector;

an optical system for causing an infrared radiation from an object to form an image on the infrared detector;

shutting means configured so that the shutting means can be opened/dosed and so as to shut off an infrared radiation coming into the optical system when the shutting means is closed; and correction means for correcting an output of the infrared detector, wherein the correction means determines a second correction coefficient for correcting variations in a DC offset among pixels and fluctuations in an amount of infrared radiation from the optical system by using an output of the infrared detector imaging the shutting means while the shutting means is closed and a first correction coefficient proportional to a sensitivity of each pixel of the infrared detector and shading wherein:

the infrared imaging device comprises second shutting means configured so that the second shutting means can be opened/closed and so as, to shut off an infrared radiation coming into the optical system when the second shutting means is closed; and the correction means determines the first correction coefficient by using the output of the infrared detector imaging the shutting means being closed and an output of the infrared detector imaging the second shutting means being closed.

5. The infrared imaging device of claim 4, wherein:

the infrared Imaging device comprises temperature measurement means for measuring a surface temperature of the shutting means; and the correction means determines the correction coefficient by using a temperature measured by the temperature measurement means.

6. The infrared imaging device of claim 4, wherein the shutting means is a flat-plate member having a uniform temperature distribution.

7. An infrared imaging device, comprising:

an infrared detector;

an optical system for causing an infrared radiation from an object to form an image on the infrared detector;

shutting means configured so that the shutting means can be opened/closed and so as to shut off an infrared radiation coming into the optical system when the shutting means is closed; and correction means for correcting an output of the infrared detector, wherein the correction means determines a second correction coefficient for correcting variations in a DC offset among pixels and fluctuations in an amount of infrared radiation from the optical system by using an output of the infrared detector imaging the shutting means while the shutting means is closed and a first correction coefficient proportional to a sensitive of each pixel of the infrared detector and shading wherein:

the infrared imaging device comprises temperature setting means for setting a temperature of the shutting means; and the correction means determines the first correction coefficient by using an output of the infrared detector imaging the shutting means being closed, which has been set to a first temperature by the temperature setting means, and an output of the infrared detector imaging the shutting means being closed, which has been set to a second temperature by the temperature setting means.

8. The infrared imaging device of claim 7, wherein:

the infrared imaging device comprises temperature measurement means for measuring a surface temperature of the shutting means; and the correction means determines the correction coefficient by using a temperature measured by the temperature measurement means.

9. The infrared imaging device of claim 7, wherein the shutting means is a flat-plate member having a uniform temperature distribution.

10. An infrared imaging device, comprising:

an infrared detector;

an optical system for causing an infrared radiation from an object to form an image on the infrared detector;

shutting means configured so that the shutting means can be opened/closed and so as to shut off an infrared radiation coming into the optical system when the shutting means is closed; and correction means for correcting an output of the infrared detector, wherein the correction means determines a second correction coefficient for correcting variations in a DC offset among pixels and fluctuations In an amount of infrared radiation from the optical system by using an output of the infrared detector imaging the shutting means while the shutting means is closed and a first correction coefficient proportional to a sensitive of each pixel of the infrared detector and shading wherein:

the infrared imaging device comprises temperature setting means for setting a temperature of the shutting means; and the temperature setting means sets the temperature of the shutting means to a temperature in a vicinity of a temperature of a particular object to be imaged while the shutting means is closed.

11. The infrared imaging device of claim 10, wherein:

the infrared imaging device comprises temperature measurement means for measuring a surface temperature of the shutting means; and the correction means determines the correction coefficient by using a temperature measured by the temperature measurement means.

12. The infrared imaging device of claim 10, wherein the shutting means is a flat-plate member having a uniform temperature distribution.

* * * * *

UNITED STATES PATENT AND TRADEMARK OFFICE
CERTIFICATE OF CORRECTION

PATENT NO.    : 6,700,124 B1
DATED         : March 2, 2004
INVENTOR(S)   : Tsuyoshi Mekata et al.

It is certified that error appears in the above-identified patent and that said Letters Patent is hereby corrected as shown below:

Column 7,
Lines 7-9, "Fig. 7 is a diagram illustrating a configuration of a vehicle having an infrared imaging device according to the fifth embodiment of the present invention intalled therein." should be -- FIG. 7 is a diagram illustrating a configuration of an infrared image adjustment device according to the fifth embodiment of the present invention. --
Line 48, "closed" should be -- opened --

Column 16,
Line 16, "opened/dosed" should be -- opened/closed --
Line 32, "as," should be -- as --
Line 41, "Imaging" should be -- imaging --
Line 66, "sensitive" should be -- sensitivity --

Column 18,
Line 5, "In" should be -- in --
Line 9, "sensitive" should be -- sensitivity --

Signed and Sealed this

Twenty-ninth Day of March, 2005

JON W. DUDAS
*Director of the United States Patent and Trademark Office*